(12) United States Patent
Pysher et al.

(10) Patent No.: US 6,454,117 B1
(45) Date of Patent: Sep. 24, 2002

(54) MANWAY FOR PRESSURE VESSELS

(75) Inventors: Rick D. Pysher, Overland Park; Kyle T. Minden, Paola; Michael England, Paola, all of KS (US)

(73) Assignee: Taylor Forge Engineered Systems, Inc., Paola, KS (US)

( * ) Notice: Subject to any disclaimer, the term of this patent is extended or adjusted under 35 U.S.C. 154(b) by 92 days.

(21) Appl. No.: 09/754,696

(22) Filed: Jan. 4, 2001

(51) Int. Cl.[7] ............................................... B65D 45/00
(52) U.S. Cl. ..................... 220/327; 220/825; 220/833; 220/845; 292/256.73; 292/256.75
(58) Field of Search .................................. 220/327, 328, 220/323, 315, 825, 835, 834, 833, 836, 845, 314; 292/256.73, 256.75; 49/371

(56) References Cited

U.S. PATENT DOCUMENTS

| | | | | |
|---|---|---|---|---|
| 2,941,236 A | * | 6/1960 | Monroe et al. | 292/256.73 |
| 3,449,860 A | * | 6/1969 | Franks, Jr. et al. | 220/327 |
| 4,096,968 A | * | 6/1978 | Treiber et al. | 220/314 |
| 4,324,344 A | * | 4/1982 | Kunz | 220/825 |
| 4,465,201 A | * | 8/1984 | Chalfant, Jr. | 220/327 |
| 4,589,564 A | * | 5/1986 | Olster et al. | 330/327 |
| 5,481,790 A | * | 1/1996 | Koreis et al. | 220/327 |
| 6,109,823 A | | 8/2000 | Halferty et al. | |

* cited by examiner

*Primary Examiner*—Nathan J. Newhouse
(74) *Attorney, Agent, or Firm*—Hovey Williams LLP

(57) ABSTRACT

A manway assembly (10) designed for mounting within an opening (19) in a vessel wall (20) is provided which includes a manway ring (12) having a passageway (24) therethrough, with an inner cover (14) and a cover lock (18). The cover (14) is supported by a swing mount (16) including a tubular member (42), an arm (44) telescopically received within member (42), and a suspension connector (48). The lock (18) is made up of studs (38) secured to cover (14) and extending through passageway (22), with an annular locking plate (50) having bores (54) for receiving the studs (38); nuts (64) complete the locking arrangement.

14 Claims, 3 Drawing Sheets

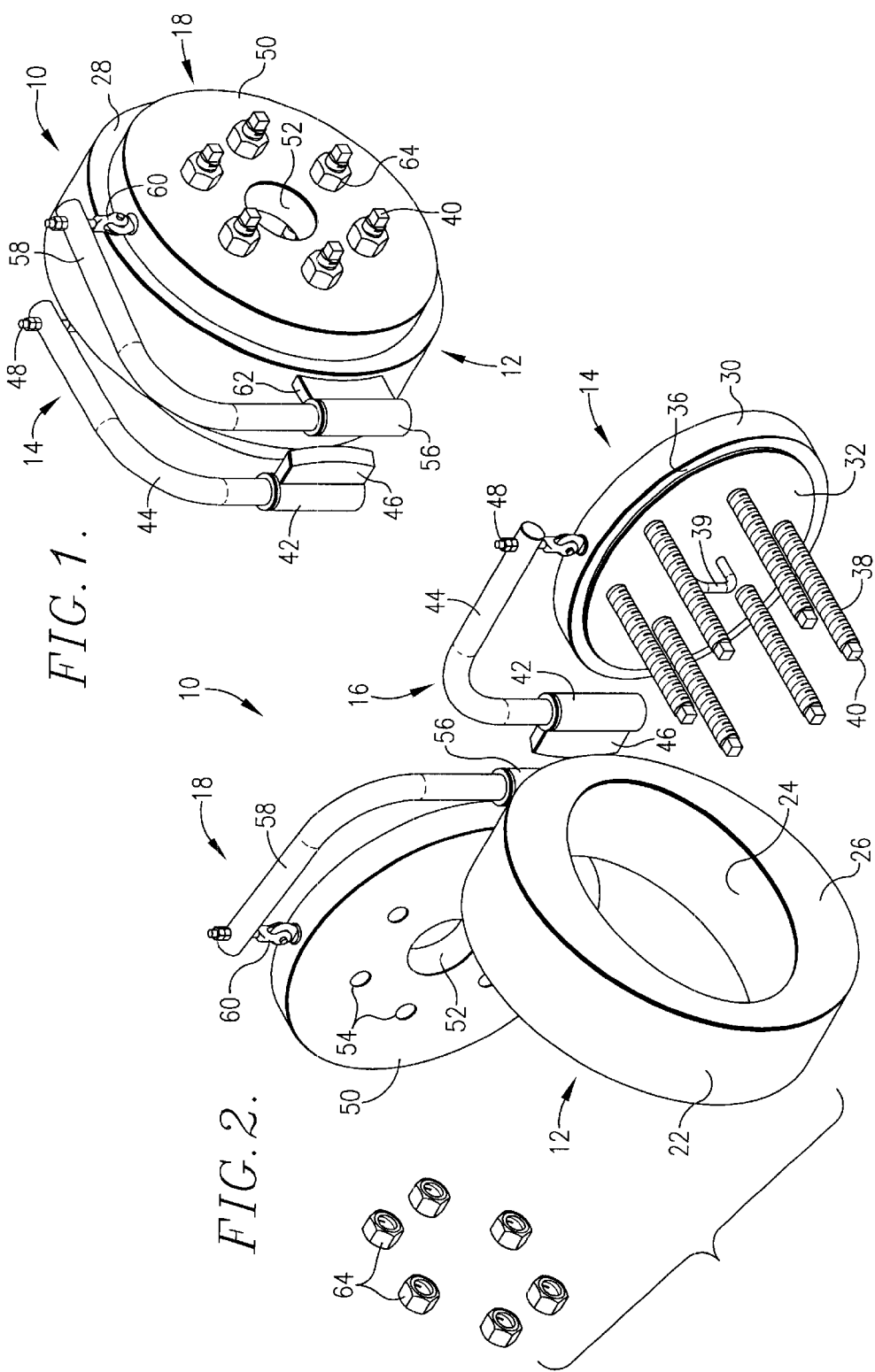

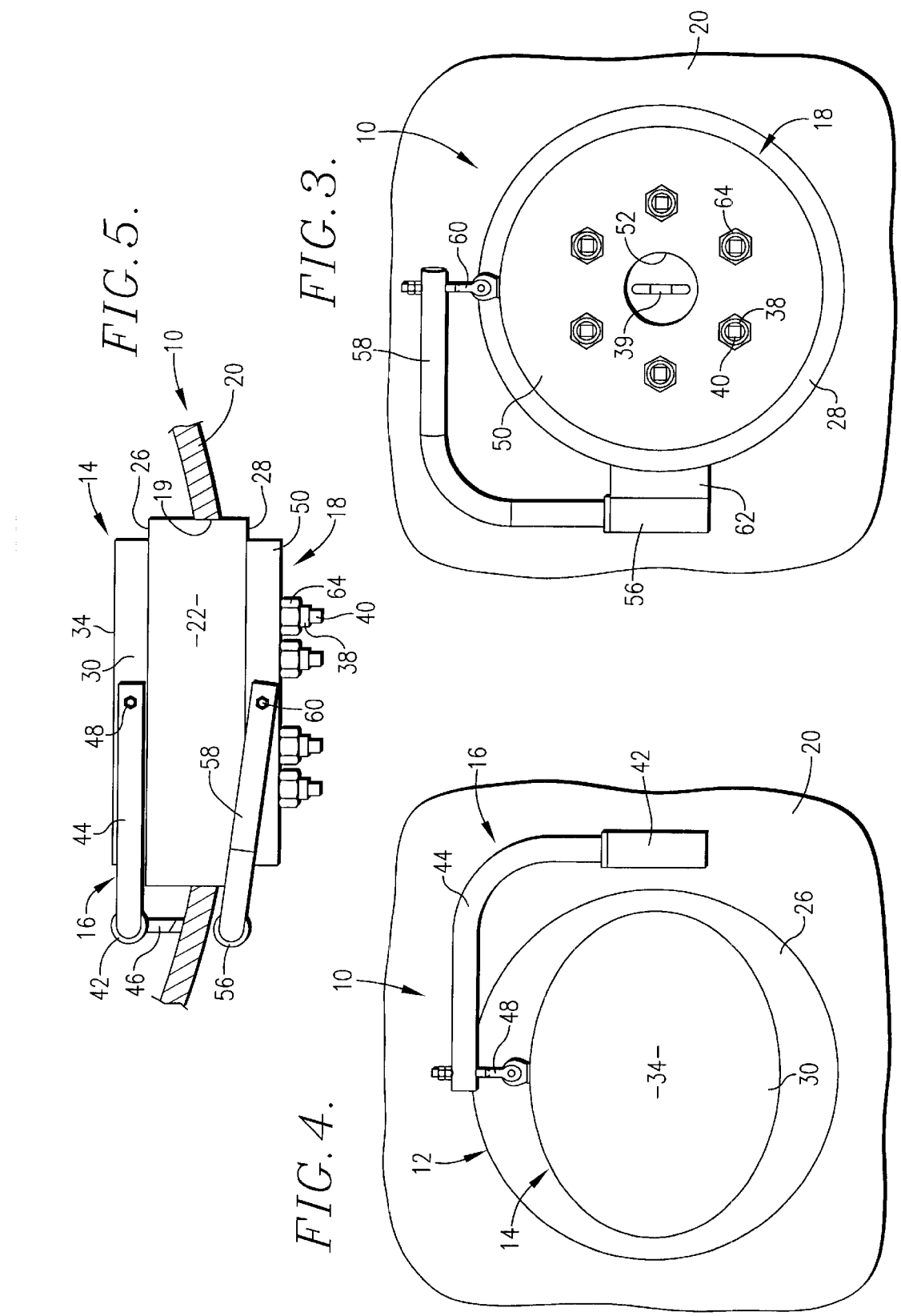

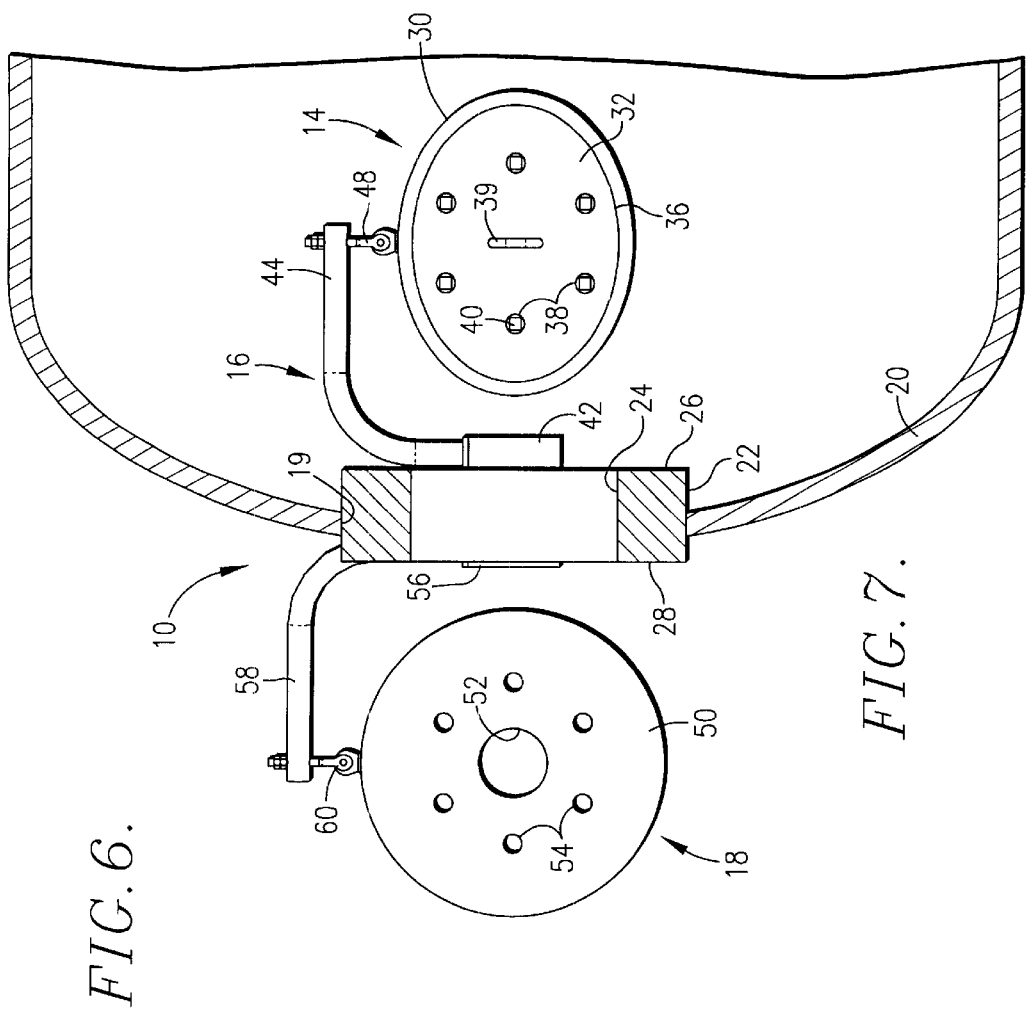
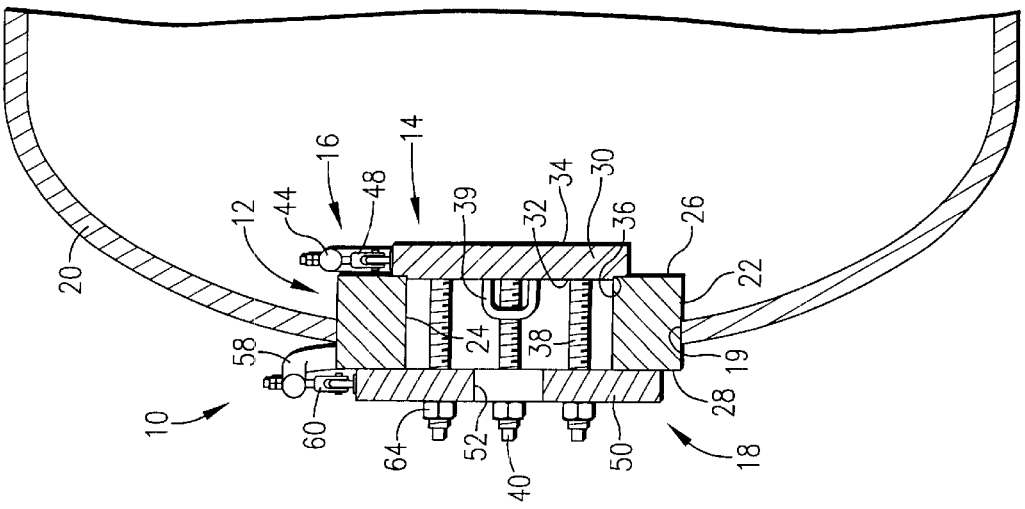

MANWAY FOR PRESSURE VESSELS

BACKGROUND OF THE INVENTION

1. Field of the Invention

The present invention is broadly concerned with manway assemblies adapted for mounting within an opening provided in a vessel wall or the like in order to provide selective access to the interior of the vessel. More particularly, the invention pertains to such manway assemblies which are equipped with an inner manway cover that may be selectively opened from the exterior of the vessel to provide access; preferably, the inner cover is swingably mounted for movement between a closed and an open position, and wherein the cover is supported by a swing mount including a pivotal support arm and a coupler which are telescopically interfitted. Such a cover support permits ready adjustment and/or removal of the manway cover as necessary.

2. Discussion of Prior Art

Large vessels such as holding tanks or petroleum transfer conduits are normally equipped with manways permitting access to the interior of the vessels for repair or inspection purposes. Such manways come in a variety of styles. The most simple manway involves use of a cover which may be bolted to an upstanding annular flange. In other applications, however, it is desirable to have an internal cover. For example, in high pressure vessels, it is advantageous to equip a manway assembly with an internal cover so that vessel pressure assists in providing a high-integrity seal. Such internal cover manway assemblies are known. However, in general they are characterized by a very complex construction and difficulty in installation. A particular problem with such prior assemblies is the fact that the internal manway cover is hingedly mounted to a manway ring or the like. In such instances it is difficult to adjust the inner cover to provide the best possible seal.

In addition, some prior internal cover manway assemblies cannot be readily opened or manipulated from a position exterior to the vessel. As a consequence, while the use of internal cover manway assemblies is in many cases preferred, the cost and complexity of prior assemblies of this type has detracted from the usefulness thereof.

OBJECTS AND SUMMARY OF THE INVENTION

The present overcomes the problems outlined above and provides an improved manway assembly adapted for mounting within an opening provided in a vessel wall or the like, in order to provide selective access to the interior of the vessel. The manway assembly broadly includes a ring having a circular or round outer periphery and an inner passageway therethrough, with the ring adapted for securement proximal to a wall opening in order to present an inner surface adjacent the vessel interior and an opposed outer surface. The overall assembly further includes an internal cover sized to engage the ring inner surface and cover the passageway. The internal cover is preferably secured via a swing mount supporting the cover from movement between a passageway-covering position in engagement with the ring inner surface, in an open position allowing access to the vessel interior through the passageway. The swing mount includes a pivotal cover-supporting arm and a coupler, with the arm and coupler being telescopically interfitted and relatively separable to permit adjustment and/or removal of the internal cover. Finally, the overall assembly includes a cover lock operable to releasibly lock the cover in the passageway-covering position thereof. Further, this lock is manipulable from outside the vessel to selectively unlock the cover and allow movement thereof.

In preferred forms, the cover swing mount comprises a tubular member fixedly secured adjacent the manway assembly ring, with the arm supporting the cover telescopically received within the tubular member. In the fashion, the swing mount for the cover is in the form of a davit-type assembly.

Both the inner manway cover and the passageway provided through the circular manway ring are of oval configuration. In this way, the manway cover may be detached and passed through the oval opening for repair or replacement purposes.

The cover lock is preferably in the form of a bolt plate swingably mounted adjacent the manway ring outer surface and having at least one bolt-receiving bore therethrough. A threaded bolt shank is secured to the outer face of the cover and is adapted to extend through the passageway and plate bore. A nut is threaded onto the bolt to interconnect the cover and bolt plate. Normally, the bolt plate has a plurality of circumferentially spaced bores therethrough, whereas the cover is equipped with a like number of outwardly extending threaded studs. The latter are preferably threaded into corresponding blind bores in the manway cover, and can be detached as necessary from the cover. To this end, the outer ends of the threaded studs are provided with square or hexagonal ends, thereby facilitating wrench-removal thereof.

The bolt plate is also preferably mounted using a davit-type mounting arrangement very similar to that employed for the internal manway cover. Thus, the bolt plate is supported on a swingable arm, the latter being telescopically received within an external tubular member.

BRIEF DESCRIPTION OF THE DRAWING FIGURES

Preferred embodiments of the invention are described in detail below with reference to the attached drawing figures, wherein:

FIG. 1 is a perspective view of a manway access assembly in accordance with the invention, viewing in the foreground the normally exterior bolt plate;

FIG. 2 is an exploded view of the assembly depicted in FIG. 1, shown with the internal cover and bolt plate in their opened positions;

FIG. 3 is a front elevational view of a manway assembly in accordance with the invention, shown mounted in the wall of a vessel or the like;

FIG. 4 is a rear elevational view of the assembly depicted in FIG. 3, illustrating the inner face of the assembly and with the oval-shaped cover in its sealing and locked orientation;

FIG. 5 is a sectional view illustrating the assembly of FIGS. 3–4 mounted in a vessel wall;

FIG. 6 is a vertical sectional view of the preferred manway cover assembly, shown in its closed position and mounted in a vessel wall; and FIG. 7 is a view similar to that of FIG. 6, but depicting both the inner cover and outer bolt plate in their opened position.

DETAILED DESCRIPTION OF THE PREFERRED EMBODIMENT

Now to the drawings, and particularly FIGS. 1–2, a manway assembly 10 is depicted. The assembly 10 broadly includes a manway ring 12 having a round outer diameter, an internal cover 14 movable via swing mount 16, and a cover lock 18 secured to ring 12. As shown in FIGS. 3–5, the assembly 10 is especially adapted for mounting in a circular opening 19 provided in a wall 20 of a vessel or the like.

In more detail, the ring 12 is preferably a metallic body presenting a circular outermost periphery 22 as well as an oval-shaped central passageway 24 therethrough. As will be readily seen from a study of FIG. 5, the ring 12 is designed to be welded in place within the wall opening 19. The ring 12 thus presents an annular inner face 26 and an opposed annular outer face 28.

The cover 14 is in the form of a metallic plate 30 of generally oval configuration and having an outer sealing face 32 and an inner, opposed face 34. Note that the sealing face 32 has a peripheral offset 36 which is adapted to receive an elastomeric sealing ring, if desired. The oval-shaped plate 36 is adapted to sealingly engage the corresponding oval-shaped passageway 24, with the peripheral offset 36 facilitating a sealing fit between the plate 30 and ring 12. It will further be observed that the outer face 32 of plate 30 has a total of six projecting threaded studs 38, with the latter extending outwardly and having, at their outermost ends, wrench flats 40. Also, the outer face 32 of the plate 30 is equipped with a central handle 39 of generally U-shaped configuration.

The swing mount 16 for cover 14 is preferably a davit-type arrangement and includes a tubular member 42 adapted welded to the inner face of vessel wall 20 adjacent opening 19, as well as a generally L-shaped support arm 44 which is telescopically received within the member 42. As illustrated, the member 42 includes a connection leg 46 allowing welding or other appropriate connection of this member 42 to the inner surface of vessel wall 20. The plate 30 is suspended from the upper and outboard end of arm 44 by means of a suspension connector 48.

The lock 18 is in the form of an annular outer plate 50 having a central access opening 52 formed therethrough, as well as a series of circularly arranged bores 54. The plate 50 is supported on another davit-type swing mount, including a tubular member 56 and an L-shaped support arm 58; the plate 50 is suspended from arm 58 via connector 60. The member 56 is welded directly to the periphery 22 of ring 14 through a short flange 62 forming a part of the member 56. The overall lock 18 further includes a series of nuts 64 which are designed to be threaded onto studs 38 in a manner to be described.

The assembly 10 is placed in its locked, covering position depicted in FIGS. 3–6 in the following manner. First, the cover 14 is swung to its passageway-covering position where the offset 36 provided on the inner face thereof engages the periphery of passageway 24. In this orientation, the studs 38 extend through the passageway 22. Next, the plate 50 is swung to a position engaging the outer face 28 of ring 14, with the individual studs 38 extending through the bores 54. Nuts 64 are then applied to the individual studs 38, thereby drawing the plate 50 into tight engagement with ring 22, and also causing the cover plate 30 to be drawn into tight, sealing engagement with the inner face 26 of the ring 14. Of course, when it is desired to open the assembly 10, this procedure is merely reversed. That is, the nuts 64 are removed from the studs 38, and the plate 50 is swung outwardly to the FIG. 7 position thereof. At this point, the user may grasp handle 39 and push inwardly, thereby opening the cover 14 in permitting access to the interior of the vessel.

Use of davit-type supports for the cover 14 and locking plate 50 affords a number of advantages. First, the vertical position of the plates can be readily adjusted owing to the telescopic nature of the mounting assemblies. If it is necessary to replace the inner cover 14, it is only necessary to remove the studs 38 from the face thereof, followed by detachment of the connector 48. Then, the plate 30 may be turned and moved through the oval-shaped opening 24 in annular ring 12.

It will thus be seen that the present invention provides a greatly improved manway assembly which can be easily and efficiently mounted in the field, and also has the virtue of ready adjustability and ease of repair.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A manway assembly adapted for mounting within a opening provided in a vessel wall to provide selective access to the interior of this vessel, said assembly comprising:
    a ring having a circular outer periphery and an inner passageway therethrough, said ring adapted for securement proximal to said wall opening to present an inner surface adjacent said vessel interior and an opposed outer surface;
    an internal cover sized to engage said ring inner surface and cover said passageway;
    a swing mount supporting said cover for movement between a passageway-covering position in engagement with said ring inner surface, and an open position allowing access to said vessel interior through said passageway,
    said swing mount including a pivotal cover-supporting arm and a coupler, said arm and coupler being telescopically interfitted and relatively separable to permit removal of this internal cover; and
    a cover lock operable to releasibly lock the cover in said passageway-covering position, the lock being manipulable from outside said vessel to selectively unlock the cover and allow movement thereof.

2. The assembly of claim 1, said coupler comprising a tubular member fixedly secured to said ring, said arm telescopically received within the member.

3. The assembly of claim 1, said passageway and cover being of generally oval configuration.

4. The assembly of claim 1, said cover lock comprising:
    a plate swingably mounted adjacent said ring outer surface and having at least one stud-receiving bore therethrough;
        at least one threaded stud secured to said cover and adapted to extend through said passageway and bore;
        at least one nut threadable onto said stud to lockably interconnect this cover and plate.

5. The assembly of claim 4, said plate secured to said ring by an external swing mount including an external, plate-supporting swing arm and an external tubular member, said external swing arm telescopically interfitted within said external tubular member and selectively separable therefrom.

6. The assembly of claim 4, said plate having a plurality of stud-receiving bores therethrough, said cover having a corresponding plurality of threaded stud secured thereto and each adapted to extend through said passageway and a respective bore, there being a like plurality of nuts each threaded onto a corresponding stud.

7. The assembly of claim 4, there being an access port through said plate, and a handle secured to the face of the cover adjacent the plate, said handle being manually accessible through said port.

8. The combination comprising:
   a vessel having a wall with an opening therethrough; and
   a manway assembly mounted within said opening to provide selective access to the vessel interior, said assembly including;
      a ring having an outer periphery and an inner passageway therethrough, said ring secured proximal to said opening to present an inner surface adjacent said vessel interior, and an opposed outer surface;
      an internal cover sized to engage said ring inner surface and cover said passageway;
   a swing mount supporting said cover for movement between a passageway-covering position in engagement with said ring inner surface, and an open position allowing access to said vessel interior through said passageway,
   said swing mount including a pivotal cover-supporting arm and a coupler, said arm and coupler being telescopically interfitted and relatively separable to permit removal of this internal cover; and
   a cover lock operable to releasibly lock the cover in said passageway-covering position, the lock being manipulable from outside said vessel to selectively unlock the cover and allow movement thereof.

9. The combination of claim 8, said coupler comprising a tubular member fixedly secured to said ring, said arm telescopically received within the member.

10. The combination of claim 8, said passageway and cover being of generally oval configuration.

11. The combination of claim 8, said cover lock comprising:
   a plate swingably mounted adjacent said ring outer surface and having at least one stud-receiving bore therethrough;
   at least one threaded stud secured to said cover and adapted to extend through said passageway and bore;
   at least one nut threadable onto said stud to lockably interconnect this cover and plate.

12. The combination of claim 11, said plate secured to said ring by an external swing mount including an external, plate-supporting swing arm and an external tubular member, said external swing arm telescopically interfitted within said external tubular member and selectively separable therefrom.

13. The combination of claim 11, said plate having a plurality of stud-receiving bores therethrough, said cover having a corresponding plurality of threaded stud secured thereto and each adapted to extend through said passageway and a respective bore, there being a like plurality of nuts each threaded onto a corresponding stud.

14. The combination of claim 11, there being an access port through said plate, and a handle secured to the face of the cover adjacent the plate, said handle being manually accessible through said port.

* * * * *